United States Patent [19]
Johnson

[11] 4,111,430
[45] Sep. 5, 1978

[54] HAND HELD RECORD PLAYER WITH RECORD HOLDING ATTACHMENT
[75] Inventor: Reynold B. Johnson, Palo Alto, Calif.
[73] Assignee: Microsonics Corporation, Los Angeles, Calif.
[21] Appl. No.: 749,432
[22] Filed: Dec. 10, 1976
[51] Int. Cl.[2] .......................... G11B 3/40; G11B 25/04
[52] U.S. Cl. .................................... 274/9 B; 274/9 C
[58] Field of Search ............................... 274/9 B, 9 C
[56] References Cited
U.S. PATENT DOCUMENTS
3,484,111  12/1969  Staar ..................................... 274/9 B
3,952,170  4/1976  Irvin et al. ........................... 274/9 C

FOREIGN PATENT DOCUMENTS
869,376  5/1961  United Kingdom ..................... 274/9 B Primary Examiner—Steven L. Stephan
Attorney, Agent, or Firm—Gardner and Anten

[57] ABSTRACT

A record player attachment base is provided for holding and aligning a card having a miniature or microphonograph record thereon, in proper alignment for playback by a hand-held record player, referred to as a microphonograph.

16 Claims, 13 Drawing Figures

U.S. Patent  Sept. 5, 1978  Sheet 1 of 4  4,111,430
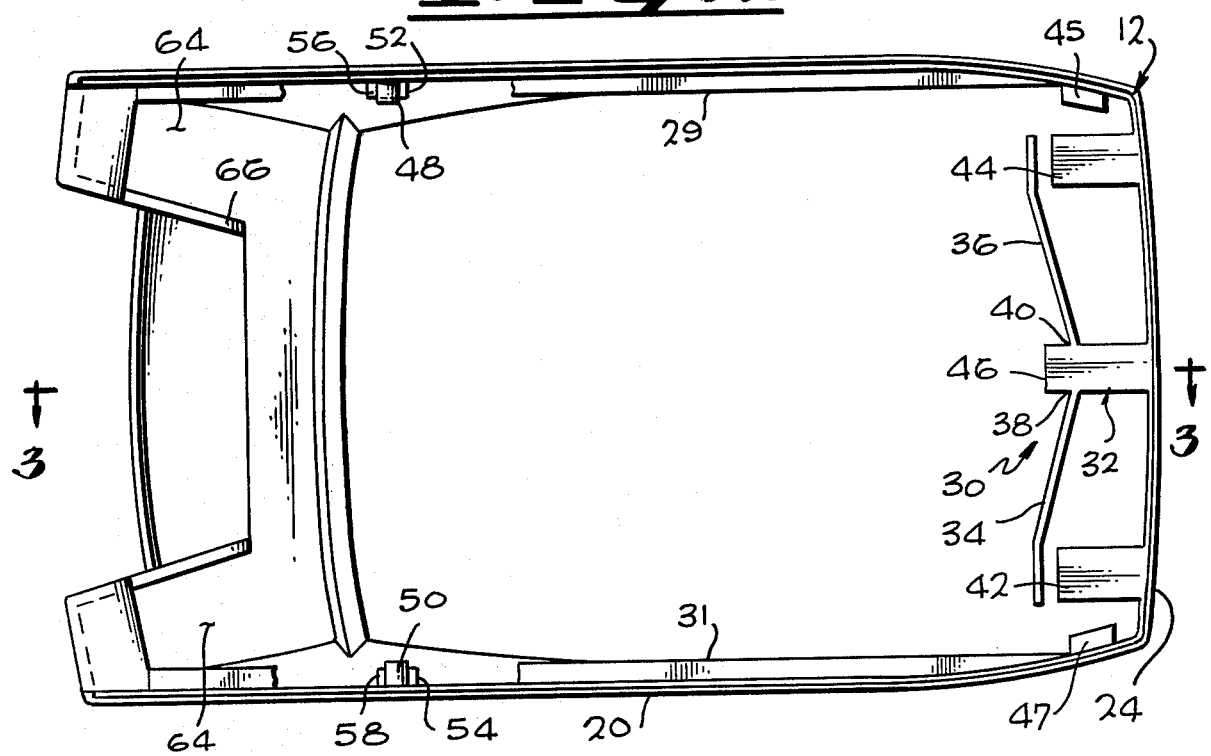

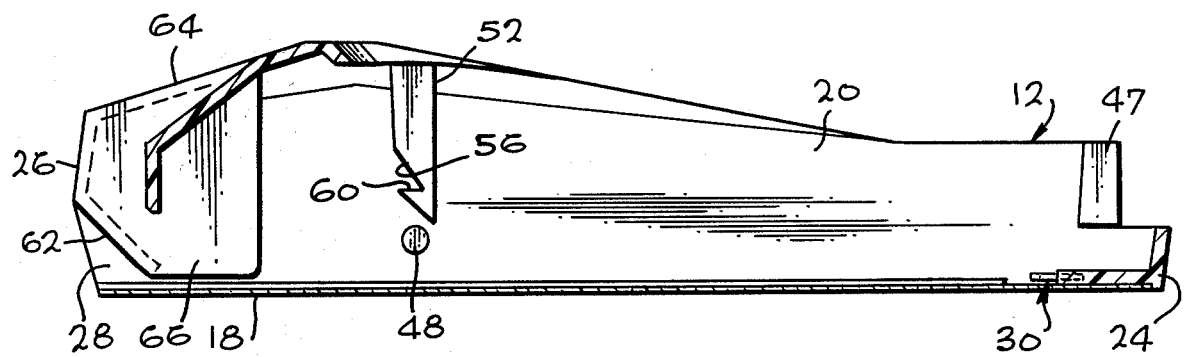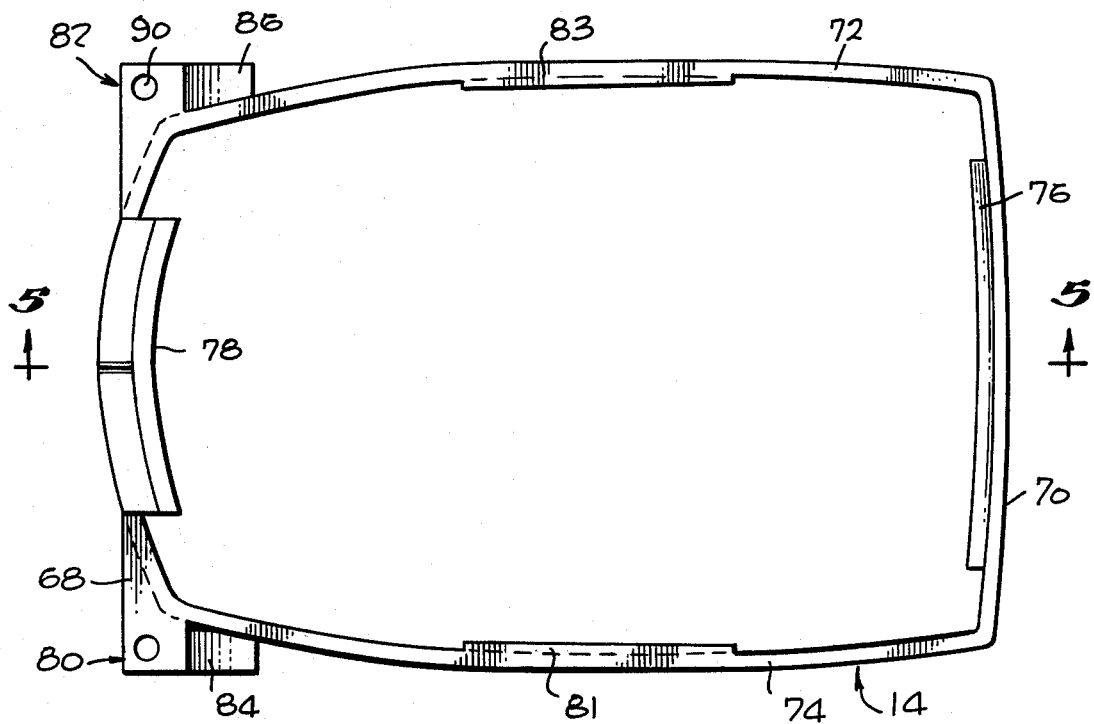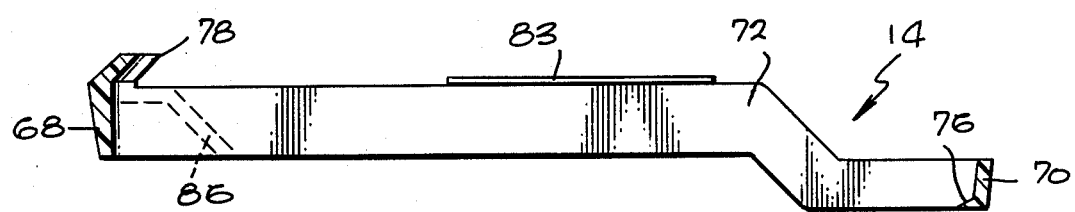

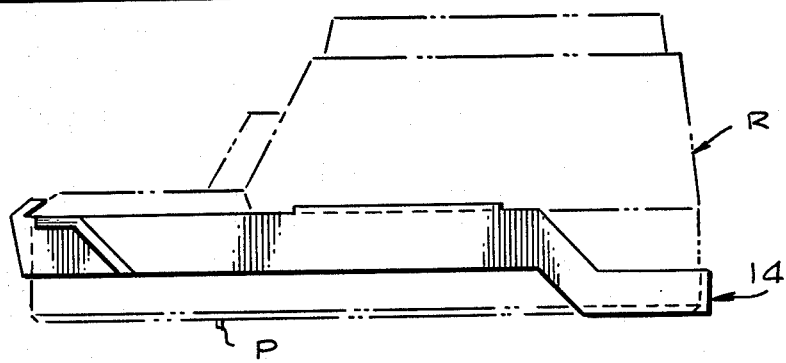
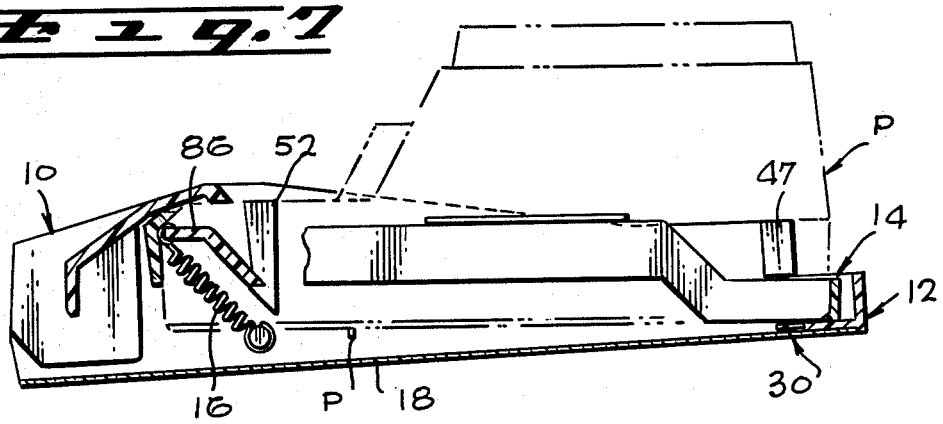
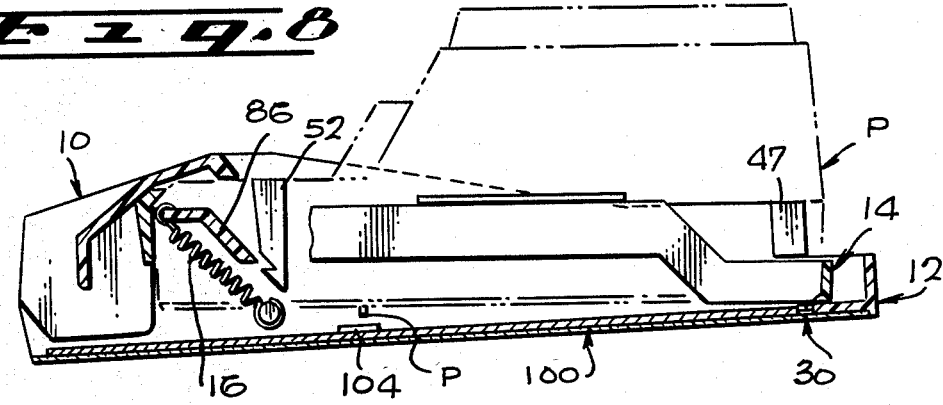

Fig.9
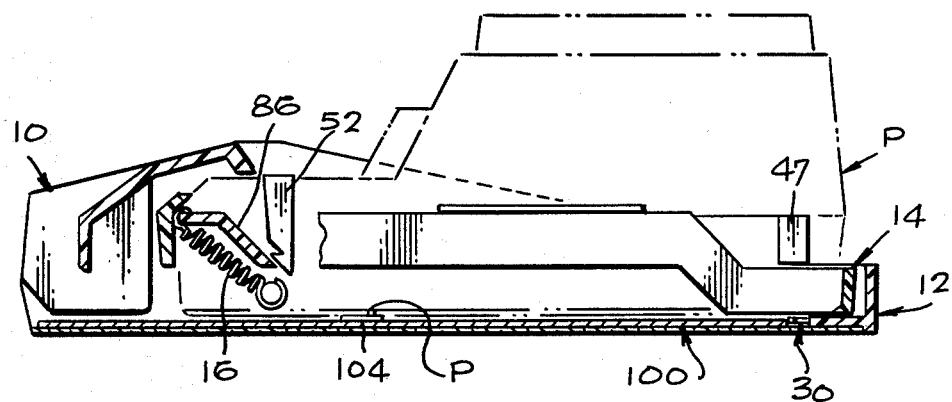
Fig.10
Fig.11
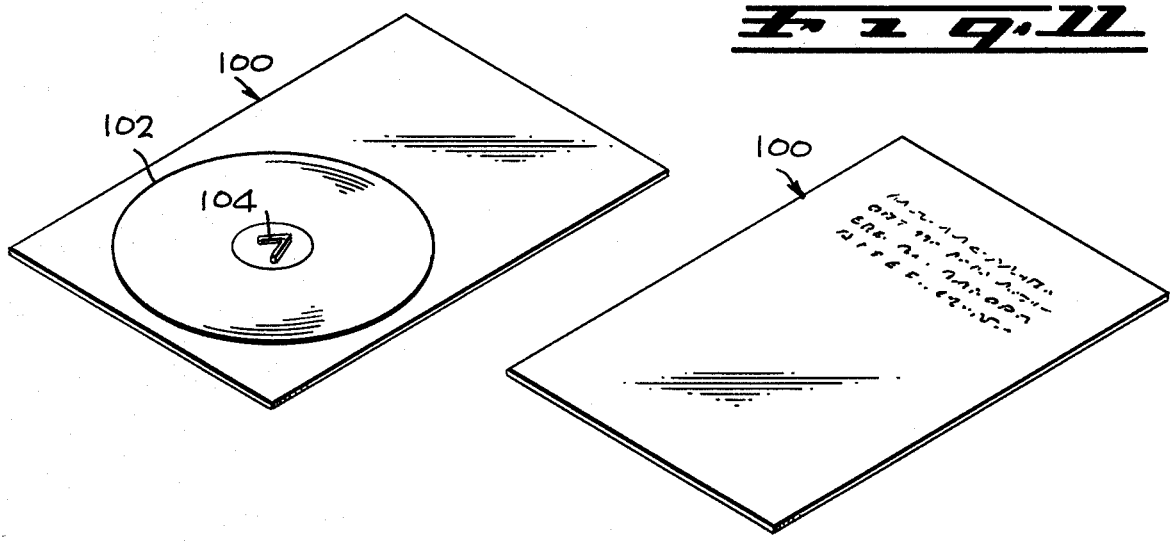
Fig.10A
Fig.10B
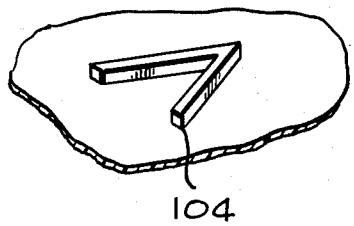
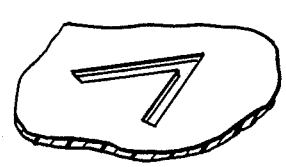

HAND HELD RECORD PLAYER WITH RECORD HOLDING ATTACHMENT

BACKGROUND

The present invention relates to a record card-holding attachment for use with a hand held apparatus for reproducing sound from a stationary record such as disclosed in U.S. Pat. No. 3,952,170.

U.S. Pat. No. 3,952,170 discloses a hand-held microphonograph unit which is used for playing a stationary record incorporated on a stationary sheet, such as a page of a book. The record player device of U.S. Pat. No. 3,952,170 is described in detail in said patent but will be described briefly herein. An indexing pin shown as 127 in FIG. 2 of U.S. Pat. No. 3,952,170 is placed on top of the microphonograph record, such as shown in FIG. 9, so that the index pin is at the center of the V- or delta-shaped centering element of the microphonograph record. Upon indexing pin 127 being so located, the unit is activated and a transducer cartridge in contact with the grooves 69 of the record 68 rotates playing back the information prerecorded on the record 68.

Although the device of U.S. Pat. No. 3,952,170 has great and varied applications, it is difficult to use the apparatus without having the record firmly supported, such as on a book or on a tabletop. Holding a sheet containing the record makes alignment of the indexing pin with the centering apparatus of the microphonograph difficult. In addition, the record would have to be maintained steady during the entire playback procedure, which may be a matter of minutes. Maintaining two relatively moveable objects stationary for such a sustained period of time is highly difficult, especially for young children.

Devices such as disclosed in Japanese Tomy patent application No. 80766/1972, have attempted to resolve the problems of the prior art devices by having a record mounted on a block which is to fit within an opening on top of a record player. There is no alignment element such as an indexing pin involved in the Tomy device and movement of the block is not contemplated. Such a device, therefore, would not be of assistance in simplifying the operation of the aligning of a record player having an indexing pin movable laterally with respect to a centering means located on a miniature record.

In the present invention a microphonograph record player is provided with a base support which cooperates with a specially designed card or record holding member having the record as a part thereof or manufactured integral with the card. The base support serves to automatically align the indexing means of the hand-held microphonograph unit with the centering means of the microphonograph record. At the same time, the base support assures that the record is supported stationary relative to the microphonograph unit during the entire play back procedure of the record. Accordingly, the device may be used by young children with a minimum of difficulty.

The base support attachment also assures that the indexing pin of the microphonograph unit will not be damaged during the playing of the record. It is possible, that excess force being applied to the indexing pin transverse to its longitudinal axis will damage the indexing pin of the hand-held microphonograph unit. The base attachment of the present invention assures that only the proper amount of tension is applied to the indexing pin, to assure proper alignment, but not so much as to result in any damage.

It is an object of the present invention to provide a hand-held microphonograph unit which is simple to operate, even by young children.

It is a further object of the present invention to provide a base attachment which facilitates the viewing of information contained in association with the material contained on the record.

It is a further object of the present invention to provide an alignment device which will more readily align an indexing pin of a microphonograph unit with the centering element of a record.

It is still another object of the present invention to provide a base support which will reduce the possibility of damaging a microphonograph unit during alignment of the indexing pin of the microphonograph unit with the centering means of the record.

It is still another object of the present invention to provide an improved educational device which facilitates the cooperation of the visual and hearing senses of a person.

These and other objects of the present invention will become apparent from a study of the following detailed description of the present invention along with the accompanying drawings.

DETAILED DESCRIPTION

FIG. 1 is a partial sectional prospective view of the card-holding housing attachment;

FIG. 2 is a bottom view of the main frame of the card-holding housing attachment;

FIG. 3 is a side sectional view taken along lines 3—3 of FIG. 2;

FIG. 4 is a top view of the insert of the card-holding housing attachment.

FIG. 5 is a side sectional view taken along lines 5—5 of the insert of FIG. 4;

FIG. 6 is a partial sectional side view of the basic record player shown attached to the insert of the card-holding housing attachment;

FIG. 7 is an illustration of the basic record player attached to the card-holding housing attachment in its open position;

FIG. 8 is the basic record player attached to the card-holding housing attachment in operation, with a card inserted, prior to alignment of the card;

FIG. 9 is a basic record player attached to the card-holding housing attachment with the indexing pin of the basic record player in alignment with the record ready for operation;

FIG. 10 is a perspective view of the top side of the card and record for use with the present invention.

FIGS. 10A and 10B are an enlarged sectional view of the centering means on the record.

FIG. 11 is a perspective view of the reverse side of the record mounted on a card for use with the present invention.

Referring to FIG. 1, a partial sectional perspective view of the card-holding housing attachment 10 is shown. The card-holding housing attachment 10 consists of a main frame 12 and an insert frame 14 movably mounted within the perimeters of the main frame 12. The main frame 12 and insert frame 14 are connected to one another by biasing spring 16. The main frame 12 is shown in greater detail in FIGS. 2 and 3.

Referring to FIGS. 2 and 3, the generally rectangular shaped main frame is shown having a transparent portion 18 forming substantially the entire bottom of the main frame, side walls 20 and 22, rear wall 24 and a front wall 26 which defines a slot entrance 28 at the lower portion of the front wall 26. The transparent portion 18 has a slight recess thereon, forming a guide 31. The transparent portion 18 may be of any material, such as plastic or glass. In the preferred embodiment, the material is made out of transparent plastic in order to minimize the chances of breakage.

Extending from the lower portion of the rear wall 24 internal of the space defined by the side walls 20 and 22, rear wall 24 and front wall 26, is a biasing means 30. The biasing means 30 consists of a projection 32 substantially centrally located on the rear wall 24 and perpendicular to the surface of the rear wall 24 along its bottom edge. Extending perpendicular to the projection 32 are a pair of spring elements 34 and 36, one on each side of the perpendicular projection 32. The spring elements 34 and 36 are movable in a plane parallel to the bottom transparent portion 18 about their ends 38 and 40 fixed to the perpendicular projection 32. Stop elements 42 and 44 restrict the rearward movement of the spring elements 34 and 36. The free ends of spring elements 34 and 36 project towards the front wall 26 beyond the forwardmost point 46 of perpendicular projection 32.

A pair of main spring posts 48 and 50 are positioned on the inside surfaces of side walls 20 and 22 proximate the intersection of side walls 22 and 20 and the bottom transparent portion 18 towards the front wall 26. The main spring posts 48 and 50 are so designed as to fixedly hold one end of a coil spring as will be discussed further in the following description.

Lug elements 45 and 47 project inwardly from the rear portion of side walls 20 and 22 terminating above the transparent bottom portion 18 a sufficient distance to accomodate the width of the rear walls of the insert frame 14.

Located substantially directly above the main spring posts 48 and 50 are a pair of notched elements 52 and 54. The notched elements 52 and 54 each have one notch 56 and 58, the notch facing the front wall 26 of the main frame and having a flat portion 60 for engaging a complementary element on the insert frame 14. A portion of the front wall is bevelled 62 proximate the slot entrance 28 to facilitate the placing of a card member in slot 28.

A portion of the main frame 12 is covered by cover 64. The cover 64 has an insert stop member 66 for restricting excessive lateral movement of the insert frame.

Referring to FIGS. 4 and 5 the insert frame 14 is shown in greater detail. FIG. 4 is a top view of the insert frame 14 while FIG. 5 is a sectional side view taken along section lines 5—5 shown in FIG. 4. The insert frame 14 has a generally rectangular configuration having front wall 68, rear wall 70 and side walls 72 and 74. The insert frame does not have any bottom or top walls and is of such dimensions to fit snuggly within the interior of the main frame 12.

The interior surface of the insert frame bounded by walls 68, 70, 72 and 74 is of such dimension so as to accomodate the basic record player as shown in FIG. 6. Projecting lip 76, projecting along the bottom edge of rear wall 70, supports the bottom rear portion of the record player while lip 78 fits over the front top portion of the record player. Side lips 81 and 83 also serve to grip the side surfaces of the record player.

The side wall 72 and 74 of the insert frame 14 taper slightly so that the length of the front wall 68 is slightly less than the length of the rear wall 70. Extending perpendicularly from the outer surfaces of side walls 72 and 74 are a pair of lugs having an angular projection 84 and 86 facing the rear wall 70. Each lug 80 and 82 has a hole 88 and 90 which is designed to fixedly hold one end of a coil spring 16. The angular projections 84 and 86 are so designed as to complement and engage the notches 56 and 58 in the main frame 12.

Referring to FIG. 1 the interconnection of the main frame 12 and the insert frame 14 may be seen. The insert frame generally, is fitted within the main frame 12. Rear wall 70 and the rear portion of side walls 72 and 74 fit beneath lug 47 in the space provided. The front wall 68 of the insert 14 is fitted beneath the cover 64 of the main frame 12. Notched elements 52 and 54 are so positioned as to be slightly rearward of the angular projections 84 and 86 projecting from lugs 80 and 82 when the insert frame is positioned within the main frame 12. One end of coil spring 16 is 13 attached fixably to main spring posts 48 and 50 and the other end of coil spring 16 is attached to the openings 88 and 90 in the lugs 80 and 82. The insert frame 14 is thus biased towards the rear wall 24 of main frame 12.

Referring to FIG. 10 a card designed for use with the present invention is illustrated. The card 100 has a generally rectangular configuration, having a width of substantially the distance between card guide elements 29 and 31 and a length substantially that of the main frame. A portion of the front wall 26 of the main frame 12 is recessed so that the card 100 may be grasped and removed from the card-holding housing attachment when desired.

The card 100 has a record 102, either integrally fixed to the card 100 during manufacuture of the card or placed on the card by other means following manufacture of the card 100. The record 102 has a centering element 104, which in the preferred embodiment of the present invention is a raised V-shaped element, as shown in FIG. 10A, the line bisecting the V-shaped element being on line with the position of the indexing pin of the basic record player, such as shown in FIG. 6. A recessed V-shaped element as shown in FIG. 10B may also be used. The V-shaped element points in the direction of the rear of the card-holding housing attachment. On the side of card 100 opposite that surface having the microrecord 102 is contained descriptive literature relating to the contents of the information contained on the microrecord 102, such as shown in FIG. 11.

The operation of the card-holding housing 10 in cooperation with card 100 may be seen from inspection of FIGS. 7 through 9. The basic microphonograph R is placed in the card-holding housing attachment 10 such as shown in FIG. 9. The lips 76, 78, 81 and 83 restrain the microphonograph R in place. As shown in FIG. 7, the insert frame 14 has its angular projections 84 and 86 fitted within complementary notches 56 in notched elements 52 and 54. Due to the bias of spring 16 projection 84 remains immobile within notch 56. In the position shown in FIG. 7 the insert frame 14 has its front end slightly raised relative to its rear end portion. The basic record player R, in such a position, has its indexing pin P raised slightly from the transparent bottom portion 18 sufficiently so as to not interfere with the passage of a card 100 beneath the indexing pin P.

Following the insertion of a card 100 within the slot 28 in the front wall 26 of the main frame 12 the card 100 pushes against the card spring elements 34 and 36 compressing such spring elements until the card presses against the most forward point 46 of projection 32. At this point, the complete main frame 12 moves in a rearward direction relative to the record player R and the insert frame 14. As the main frame 12 continues to move rearward the projections 84 and 86 disengage from notches 56 and 58 and the coil springs 16 pull the projections 84 and 86 downwardly so that projections 84 and 86 no longer engage notches 56 and 58. The travel of the main frame 12 is restricted by the insert stop member 66 coming into contact with the front wall 68 of the insert frame 14.

The operator then releases the card 100 and the main frame housing 12 allowing the tension from the main springs to pull the housing up and forward so that the microphonograph R now has its indexing pin P in contact with the top surface of the microrecord 100 on line with the bisecting line of the centering means 104. As the spring elements 34 and 36 push the card 100 forward the indexing pin P engages the sides of the raised "V" element or the groove or opening on the record 102 thereby automatically guiding and positioning the card 100 in the proper orientation for operation by the record player R.

Since the record player R is capable of operating in any orientation the entire unit may be turned over and the accompanying literature or pictoral information relating to the information stored on the reverse side of the record 102 may be viewed through the transparent bottom portion 18.

After the record player R has completed playing the record 102 the operator pushes the main frame 12 downward and slightly forward until the projections 84 and 86 once again engage the notches 56 and 58 in the main frame 12. The projecting indexing pin P is thus removed from the path of movement of the card 100 and the card may now be removed.

Employment of the card spring elements 34 and 36, or some other equivalent spring biasing means for biasing the card in a forward direction upon release of the card permits readily operating the hand-held microphonograph unit. The spring elements 34 and 36 are so designed as to avoid placing too much pressure on the indexing pin P, as well as automatically aligning the indexing pin in the centering means 104 of the microrecord 102.

The precise positioning of the microrecord and the indexing means will of course depend on the location of the indexing pin of the microrecord as well as the orientation of the record playing unit in the card-holding housing attachment 10. For example, it may be possible that the record player R has an indexing pin not on the record playing portion of the equipment. In such instance, the centering means of the record 102 will not be positioned approximate the center of the microrecord 102.

While the present invention was described with regards to the preferred embodiment, it is of course recognized that variations from the particular embodiment may be made without departing from the basic concept of the invention.

What I claim is:

1. A record holding apparatus comprising:
    a card holding assembly, comprising a frame adapted for mounting to a hand-held record player, said record player having at least one indexing pin;
    said frame having means at one end for receiving a record holding member having a record with means for centering said record in cooperation with the indexing pin of said record player;
    said frame further having means for guiding said record holding member whereby said record holding member is movable relative said frame in substantially one direction in a plane perpendicular to the longitudinal axis of said indexing pin; and
    record holding member biasing means for biasing said record holding member in a direction parallel to the plane of said record holding member to a position wherein said indexing pin is centered on said record centering means said biasing means acting upon said record holding member during operation of the record player to maintain said record centering means centered.

2. The apparatus of claim 1 wherein said record holding member biasing means biases said record holding member in the direction of the means for receiving said record holding means.

3. The apparatus of claim 1 in which said frame is substantially rectangular in shape, having a slot at one end thereof for receiving said record holding member and said biasing means at a second end thereof for biasing said record holding member toward said slot.

4. The apparatus of claim 1 in which said frame comprises a main frame and an insert frame, said main frame substantially surrounding the insert frame, said insert frame being movable relative to said main frame, in at least one direction.

5. The apparatus of claim 4 in which said insert frame and said main frame are substantially rectangular in shape, said insert frame fitting within said main frame, said main frame movable relative said insert frame between a first position wherein said record player is in a position so as to be operable upon a record in said record holding member and a second position wherein said record player is not in a position so as to be operable on a record in said record holding member, frame biasing means for biasing said main frame towards said first position, and engagement means for retaining said main frame at said second position.

6. The apparatus of claim 5 in which said frame biasing means comprises a spring and said engagement means comprises a notch and projection engagement means.

7. The apparatus of claim 5 in which said main frame has a bottom portion having at least a portion thereof being transparent.

8. The method of centering a record with an indexing pin of a record player having an indexing pin and having means for receiving a record holding member having a record thereon having centering means and biasing means for biasing a record holding member toward said receiving means in a direction parallel to the plane of said record holding member during operation of the record player comprising:
    placing said record holding member in said receiving means the surface of said record facing the record player;
    pressing said record holding member against said biasing means;
    moving said indexing pin into engagement with said centering means on said record holding member; and
    releasing said record holding member whereby said biasing means maintains a bais on said record holding member causing said centering means to engage said indexing pin preventing further movement of said record holding member in a direction toward said receiving means and maintaining said record centered.

9. The method of claim 8 in which said centering means comprises a "V" shaped element, the line bisecting the V shaped element intersecting the longitudinal axis of the indexing pin of said record player.

10. The method of claim 9 in which said "V" shaped element has its opening facing the means for receiving said record holding member.

11. The method of claim 9 in which said record holding member is substantially rectangular and said centering means is located substantially at the center of said record.

12. A record player apparatus comprising:
a record player, said record player having a depending indexing pin;
a card holding assembly attached to said record player having means at one end for receiving a record holding member having a record associated therewith with means associated with said record for centering said record in cooperation with the indexing pin of the record player;
guide means for limiting movement of said record holding member to one path of travel;
means for permitting a record holding member received in said receiving means for passing beneath said indexing pin;
means for bringing the indexing pin in contact with a centering means associated with said record holding member; and
biasing means for biasing said record holding member in a direction parallel to the plane of the record holding member relative said indexing pin to center said indexing pin and maintaining said indexing pin centered during operation of the record player.

13. The apparatus of claim 12 in which said card holding assembly comprises a first main frame and a second insert frame, said main frame being movable relative to said insert frame.

14. The apparatus of claim 13 in which said main frame is pivotable at one end relative to said insert frame whereby said indexing pin of said record player is in a first position out of the path of travel of a record card to a second position in position to engage the centering means associated with the record.

15. The apparatus of claim 14 in which the record player has means for movably maintaining said main frame in said first position.

16. The apparatus of claim 15 in which said main frame is biased by biasing means to said first position.

* * * * *